2,861,996

PROCESS OF PREPARING SERINES

Karl Hans Brathge, Frankfurt am Main, and Walter Siedel, Bad Soden am Taunus, Germany, assignors, by mesne assignments, to Parke, Davis & Company, Detroit, Mich., a corporation of Michigan No Drawing. Application March 20, 1956
Serial No. 572,621

Claims priority, application Germany March 25, 1955

5 Claims. (Cl. 260—287)

The present invention relates to the process of preparing para-nitrophenyl-serines and quinoline-serines.

It is known that phenyl-serine and homologues of this compound can be obtained by the condensation of glycocoll with aromatic aldehydes in alkaline solution (Liebig's Annalen der Chemie, vol. 284 (1895), pages 36 et. seq. and vol. 337 (1904), pages 212 et seq.). There is obtained, for example, from benzaldehyde and glycocoll at first benzylidene-glycocoll accompanied by the elimination of water, the benzylidene-glycocoll then reacts with a further molecule of benzaldehyde to form benzylidene phenyl-serine and, after acidification, phenyl-serine. This reaction can be applied generally to aromatic aldehydes, sodium being used as condensing agent (Berichte der deutsch. Chem. Ges., vol. 52 (1919), pages 1734 et seq.), and has recently been used more especially for preparing phenyl-serine and para-nitrophenyl-serine which are used, for instance, as starting materials for the production of chloramphenicol.

It is also known to condense para-nitrobenzaldehyde with esters of glycocoll with the aid of metallic sodium to produce para-nitrophenyl-serine esters (J. Chem. Soc. (London), 1949 pages 90 et seq.).

Finally, it is known from German specification No. 839,500 that non-esterified glycocoll can be condensed with paranitrobenzaldehyde by using freshly precipitated calcium hydroxide as a catalyst to form para-nitrophenyl-serine. The threo-form of para-nitrophenyl-serine is obtained, while, if an ester of glycocoll is used, mainly the erythro form is obtained (cf. C. R. hebd. Séances Acad. Sci. 231 (1950), pages 361 et seq.).

As described in the above mentioned publication (Liebig's Annalen der Chemie, vol. 337 (1904), pages 214 et seq.) it is known that the condensation product from glycocoll and aldehydes partially undergoes rearrangement by displacement of the double bond as follows:

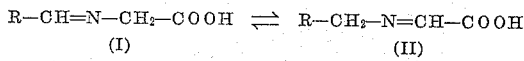

$$\text{R--CH=N--CH}_2\text{--COOH} \rightleftarrows \text{R--CH}_2\text{--N=CH--COOH}$$
(I)                           (II)

Since compound (II) cannot be converted into serine by further condensation, the rearrangement entails a reduction of the yield.

Now we have found that serines can be made in a good yield by reacting glycocoll with glyoxylic acid or its esters or ester hemiacetals to yield Schiff's bases, by condensing these in the presence of alkali metal hydroxides and/or alkaline earth metal hydroxides with para-nitrobenzaldehyde or with quinoline aldehydes and by decomposing the condensation products by means of dilute acids.

The advantage of the process of the present invention resides in the fact that in the first reaction stage it leads to a schiff's base which, in consideration of the above rearrangement scheme, can only exist in one form. Since thus no by-products can be formed on further condensation, a marked increase in the yield is obtained as well as a considerable simplification of the processing, the reason being that the glyoxylic acid or their reaction products which are formed by the decomposition of the Schiff's base are water-soluble.

When heterocyclic aldehydes are used in the second reaction stage, the process of the present invention has the further advantage that the basic serines obtained by decomposing the Schiff's base with acid are present in the form of the corresponding salts and can easily be separated from non-basic compounds present in the reaction mixture, and also from the glyoxylic acid that has split off or its decomposition products.

As aldehydes there may be used, beside para-nitrobenzaldehyde, also quinoline aldehydes such as quinoline aldehyde-(2).

The reaction of glycocoll with glyoxylic acid or the derivatives thereof is advantageously carried out in a solvent, for example, water or a mixture of water and lower aliphatic alcohols. The reaction may be carried out at room temperature, moderately decreased or moderately raised temperatures, advantageously between 40° C. and 70° C. It can be of advantage to employ a condensing agent, such as alkali metal hydroxides and/or alkaline earth metal hydroxides, preferably potassium and/or calcium hydroxide. For the further reaction it is not necessary to isolate the Schiff's base so formed.

As esters of the glyoxylic acid there may advantageously be used those with low aliphatic alcohols, preferably their ethyl esters. When using hemacetals there are preferably used those whose acetal groups are formed by reaction with the mentioned alcohols.

The reaction of the Schiff's bases obtained as intermediate products with the aldehydes, which takes place in the second stage, is carried out in the presence of alkali metal hydroxides and/or alkaline earth metal hydroxides as condensing agent. When para-nitrobenzaldehyde is used it is of advantage to use an alkaline earth metal hydroxide, preferably calcium hydroxide. It is of advantage to operate at a moderately raised temperature. The condensation products so obtained are decomposed by means of dilute acids, advantageously dilute sulphuric acid.

The compounds obtained by the process of the present invention are active pharmaceutical products and/or can be used as intermediate products for making valuable medicaments, for instance, chloramphenicol.

The following examples serve to illustrate the invention, but they are not intended to limit it thereto.

*Example 1*

To a solution of 23 grams of potassium hydroxide in 300 cc. of water are added 15 grams of glycocoll and 30 grams of glyoxylic acid ethyl ester ethyl hemaicetal. After stirring the mixture for 3 quarters of an hour at 60° C.–65° C. there are added a solution of 30 grams of para-nitrobenzaldehyde in 250 cc. of methanol, a solution of 30 grams of calcium acetate in 150 cc. of water and finally 4 grams of calcium oxide slaked with 50 cc. of water. After about 30 minutes, the whole is carefully acidified with dilute sulphuric acid (50 grams of concentrated sulphuric acid and 100 cc. of water) and after another 30 minutes the precipitated calcium sulphate is filtered off with suction and washed with methanol. The filtrate is concentrated under reduced pressure to about 300 cc. After clarification with charcoal, the filtrate is adjusted to a pH 4.8 by means of ammonia and clarified once more with charcoal. The crystalline magma formed is filtered off with suction, washed with water, stirred with acetone and once more filtered off with suction. Upon covering with ether and drying there are obtained 35–40 grams of para-nitrophenyl-serine (70–80% of the theoretical yield, calculated upon para-nitrobenzaldehyde).

Example 2

To a solution of 18 grams of glyoxylic acid monohydrate and 15 grams of glycocoll in 200 cc. of water is added at 40° C., while stirring, a milk of lime suspension obtained from 12 grams of calcium oxide and 100 cc. of water. After stirring for 2 hours at 40° C. there are added 30 grams of para-nitrobenzaldehyde, further 6 grams of calcium oxide suspended in 500 cc. of water, and, after a few minutes, 300 cc. of methanol. After stirring the mixture for another hour at 40° C., dilute sulphuric acid (45 cc. of concentrated sulphuric acid and 100 cc. of water) is added. Subsequently the temperature of the reaction mixture is raised to about 60° C. and after stirring for ½ hour the precipitated calcium sulphate is separated. The methanol is eliminated under reduced pressure and, after treating with charcoal, the aqueous solution is made neutral to Congo paper by means of ammonia. The para-nitrophenyl-serine which precipitates is filtered with suction, washed and dried. The yield amounts to 30 grams (65% of the theoretical yield, calculated upon para-nitrobenzaldehyde).

Example 3

20 grams of glyoxylic acid ethyl ester and 15 grams of glycocoll are stirred, for 1 hour at 10° C., in 300 cc. of water and with 25 grams of potassium hydroxide. There are then added a solution of 30 grams of para-nitrobenzaldehyde in 300 cc. of methanol and a suspension of 30 grams of calcium acetate in 100 cc. of water. After stirring well, there are added further 6 grams of calcium oxide suspended in 50 cc. of water. The reaction mixture is heated for ½ hour at about 60° C., acidified with a solution of 50 cc. of concentrated sulphuric acid in 100 cc. of water and separated from the precipitated calcium sulphate. The solution is concentrated under reduced pressure to 700 cc., clarified with charcoal and made neutral to Congo paper by means of ammonia. The para-nitrophenyl-serine which precipitates is filtered with suction and dried. The yield amounts to 30–35 grams (65–70% of the theoretical yield, calculated upon para-nitrobenzaldehyde).

Example 4

12 grams of potassium hydroxide are dissolved in 150 cc. of water. To this solution are added 7.5 grams of glycocoll and 15 grams of glyoxylic acid ethyl ester ethyl hemiacetal. After stirring for three quarters of an hour at about 60° C., the reaction mixture is allowed to cool to about 30° C. and there are then added a solution of 16 grams of quinolylaldehyde-(2) in 100 cc. of methanol, a solution of 15 grams of calcium acetate in 75 cc. of water, and 2 grams of calcium oxide slaked with 25 cc. of water. A precipitate is formed at once which is thoroughly stirred for another 30 minutes. The mixture is carefully acidified with dilute sulphuric acid (25 grams of concentrated sulphuric acid and 50 cc. of water), heated to about 60° and separated after 30 minutes from the precipitated calcium sulphate by filtering with suction. The filter contents is washed with weakly acidified water and with methanol. The filtrate is freed from methanol under reduced pressure and neutralised by means of sodium acetate. After standing over night, the large-flaked precipitate is filtered off with suction, washed with acetone and ether and dried.

The yield of quinolyl-serine-(2) amounts to 14–16 grams (60–70% of the theoretical yield, calculated upon quinolyl-aldehyde).

We claim:

1. The process of preparing serines which comprises reacting glycocoll at a temperature in the range from room temperature to 70° C. with substantially one equivalent of a glyoxylic acid compound selected from the group consisting of glyoxylic acid and alkyl esters and alkyl ester alkyl hemiacetals thereof in the presence of a basic condensing agent selected from the group consisting of alkali metal hydroxides and alkaline earth metal hydroxides, thereby obtaining the corresponding Schiff's base, said alkyl containing not more than 4 carbon atoms; condensing said base at a temperature in the range from room temperature to 60° C. with substantially one equivalent of an aldehyde selected from the group consisting of para-nitrobenzaldehyde and 2-quinoline aldehyde in the presence of a basic condensing agent selected from the group consisting of alkali metal hydroxides and alkaline earth metal hydroxides; and hydrolyzing the resulting serine Schiff's base with an excess of dilute mineral acid at elevated temperature up to about 60° C. to obtain the corresponding primary amine.

2. Process according to claim 1 wherein said glyoxylic acid compound is glyoxylic acid ethyl ester ethyl hemiacetal and said aldehyde is para-nitrobenzaldehyde.

3. Process according to claim 1 wherein said glyoxylic acid compound is glyoxylic acid and said aldehyde is para-nitrobenzaldehyde.

4. Process according to claim 1 wherein said glyoxylic acid compound is glyoxylic acid ethyl ester and said aldehyde is para-nitrobenzaldehyde.

5. Process according to claim 1 wherein said glyoxylic acid compound is glyoxylic acid ethyl ester ethyl hemiacetal and said aldehyde is 2-quinoline aldehyde.

No references cited.